United States Patent

[11] 3,543,879

| [72] | Inventors | Robert L. Munn |
| | | Warren; |
| | | John J. Mikton, Mount Clemens, Michigan |
| [21] | Appl. No. | 769,627 |
| [22] | Filed | Oct. 22, 1968 |
| [45] | Patented | Dec. 1, 1970 |
| [73] | Assignee | The Cross Company |
| | | Fraser, Michigan |

[54] OIL MIST LUBRICATING SYSTEM
9 Claims, 3 Drawing Figs.

[52] U.S. Cl. .................................................. 184/6, 277/3
[51] Int. Cl. ...................................................... F16n 29/00
[50] Field of Search ........................................... 184/6, 6(Z), 6(Y); 277/3, 15; 308/187

[56] References Cited
UNITED STATES PATENTS

| 2,407,807 | 9/1946 | Bentley .......................... | 277/3X |
| 3,375,903 | 4/1968 | Swearingen ................... | 184/6 |
| 3,392,804 | 7/1968 | LaFleur et al. ................. | 277/15 |

Primary Examiner—Manuel A. Antonakas
Attorney—Harness, Dickey & Pierce

ABSTRACT: Bearings, gears and other operating parts located within a closed area are lubricated by an oil-mist system which delivers oil-ladened air to the area and from which it is conducted to a filter assembly which separates the oil particles from the air and delivers the air back to atmosphere. To prevent the oil-mist air from escaping from the area, a chamber has air delivered thereto at slightly higher pressure than the oil-mist air. The higher pressure air escapes from the chamber to atmosphere and retains the oil-mist air within the area, thereby preventing the ambient air from being contaminated. The escaping of the higher pressure air prevents the ingress of dirt and other contaminants to the area.

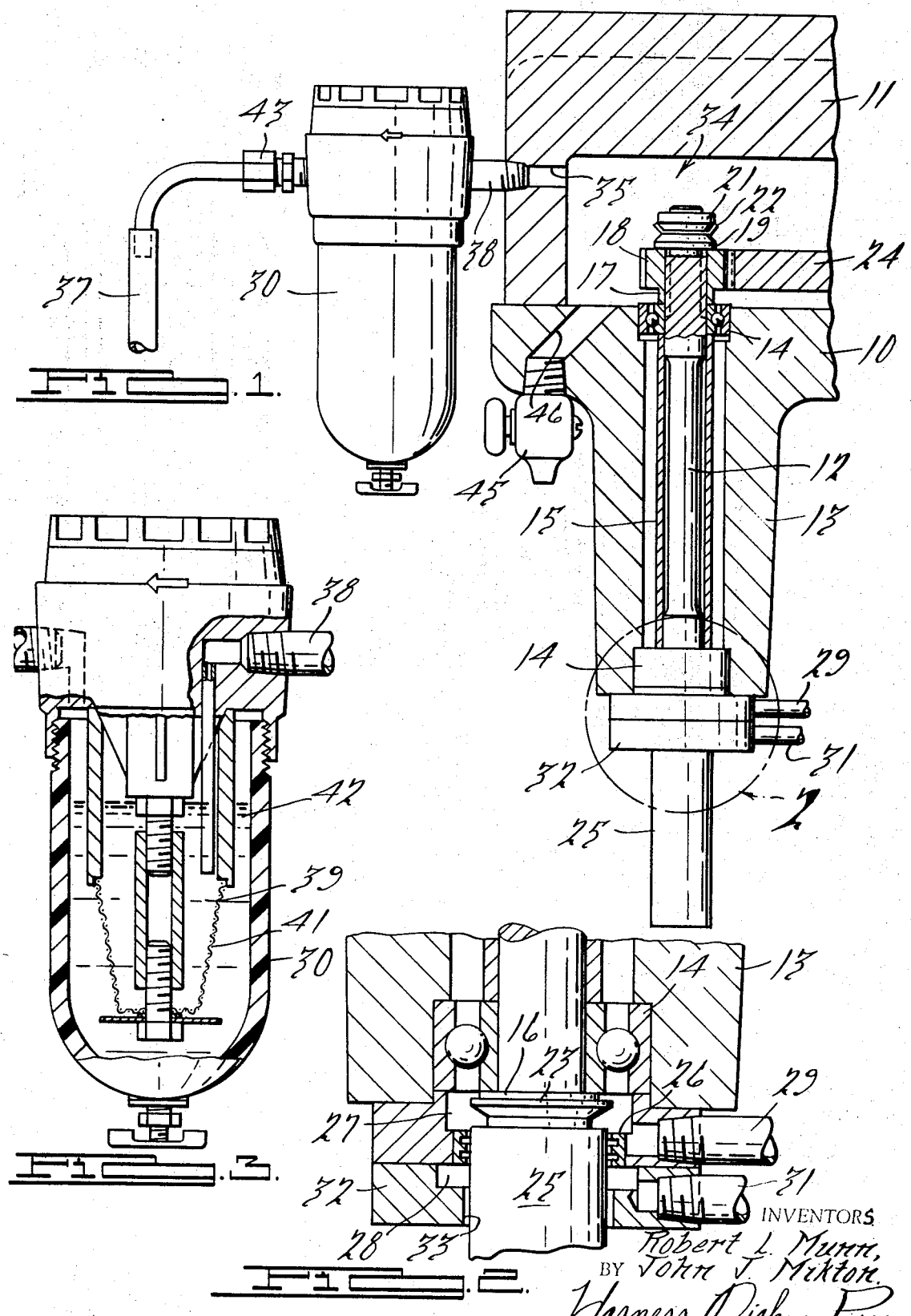

OIL MIST LUBRICATING SYSTEM

BACKGROUND OF THE INVENTION

Reference may be had to U.S. Pat. Nos. 2,664,173; 2,762,664; 2,986,433; 3,042,462; 3,191,719; 3,197,869 which were uncovered in a search for the closest known art.

SUMMARY OF THE INVENTION

While the oil-mist lubricating system is herein illustrated as being applied to a shaft, bearings and driven elements within an area, this specific disclosure is only by way of example as it is to be understood that any area to be lubricated can have the system applied thereto. The system maintains the environment outside of the area free from the oil-mist air and protects the area against dirt and grime which might otherwise enter thereinto. A pair of chambers at the intake to the area are spaced by a sealing element therebetween which is slightly spaced from a rotatable shaft extending therethrough and through the chambers. One chamber located inwardly of the seal has oil-mist air delivered thereto and to the bearing and drive elements located within the area at a predetermined pressure. The other chamber, located outwardly of the seal, has air delivered thereto at a slightly greater pressure. A greater clearance is provided outwardly of the chamber about the shaft than between the seal and the shaft so that most of the air at higher pressure will flow outwardly of its chamber while only a slight amount will move past the seal into the chamber in which the oil-mist is introduced. With this differential in pressure, the oil-mist air cannot move outwardly of the area and the ambient air cannot be contaminated with the oil-mist air. Further, it will be noted that the outward flow of air will prevent any dirt and grime from entering the area being lubricated.

The area is connected to a filter located remotely from the chambers which separates the air from the oil and returns it to atmosphere. The oil-mist air from the inlet chamber passes through the area to the filter and lubricates all the elements in the area including the shaft, bearing and the driving and driven elements. The use of oil-mist is an excellent method for lubricating bearings, gears, chain drives and the like with a low oil consumption and the further benefit of cooling the parts. The major drawback to such a system had been the contamination of the air about the machine which presented a serious health problem. The surface of oil on the exterior parts collected dirt and grime which worked into the area being lubricated producing a detrimental effect. This is prevented by the outflow of air from the area.

BRIEF DESCRIPTION OF THE DRAWING

FIG. 1 is a sectional view of operating parts within an area which is lubricated by the air mist lubricating system of the present invention;

FIG. 2 is an enlarged sectional view of the structure illustrated in FIG. 1, as viewed within the circle 2 thereof, and FIG. 3 is a broken sectional view of a filter system shown on the structure in FIG. 1.

DESCRIPTION OF THE PREFERRED EMBODIMENT

Referring to the drawing, a machine 11 has a plurality of spindles 12 driven from a driving element (not shown). A face plate 10 of a machine has a plurality of spindle supporting heads 13 in which bearings 14 secure the spindle for rotation. The inner race of the bearings has the facing ends spaced by a sleeve 15. The opposite ends engage a flange 16 at the forward end of the spindle and a sleeve section 17 on a gear 18. The assembly is clamped together by a nut 19 and a backup nut 21 with a lockwasher 22 therebetween. An oil slinging flange 23, adjacent to the flange 16, centrifugally throws any oil collected thereon back into the air path to be picked up by the oil-mist air. The gear 18 is driven by a gear 24 directly from a motor or other power source or from adjacent spindles which are driven simultaneously.

As illustrated in FIG. 2, the driven end 25 of the spindle has a sealing ring 26 which is slightly spaced from the spindle to have the inner face located closely adjacent thereto but out of contact therewith. The ring is preferably made of a soft material, such as bronze, so that in case the driven end 25 of the spindle and the inner face of the ring are not concentric to each other, a wear on the soft material of the sealing ring will eliminate contact here therebetween. The seal separates an inner chamber 27 from an outer chamber 28 except for the very slight annular passageways therebetween.

A conduit 29 communicates with the chamber 27 while a conduit 31 communicates with the chamber 28. The conduit 29 delivers oil-mist air to the chamber 27 at a predetermined pressure. The conduit 31 delivers air to the chamber 28 at a slightly higher pressure in the order of 2 to 5 p.s.i. A cap 32 which forms the chamber 28 has an aperture 33 which is spaced from the driven end 25 of the spindle a greater distance than the spacing of the inner face of the sealing ring 26 therefrom. As a result, the greater pressure of air delivered by the conduit 31 will pass outwardly through the space between the aperture 33 and the driven end 25 of the spindle. The pressure of air within the chamber 28 being greater than that in the chamber 27 will prevent the oil-mist air from passing outwardly of the sealing ring 26 toward the chamber 28. Any air flow will occur in the other direction past the sealing ring into the chamber 27. Only a very small amount of the air from the chamber 28, if any, will move into the chamber 27.

The oil-mist air delivered from the conduit 29 into the chamber 27 will pass into the spindle supporting head 13 about the bearings 14 which will be lubricated thereby and into the area 34 containing the gears 18 and 24. The oil in the oil-mist air will be deposited on the bearings, on the gear teeth faces and on any other engaged moving part to produce the proper lubrication of the operating surfaces thereof. The oil-mist air will eventually pass out through an aperture 35 to a mist-air filter 30 where the oil will be separated from the air so that the air can be returned to the atmosphere through a conduit 37. The oil-mist air passes from the aperture 35 through a conduit 38 which supports the filter 30 and enters a central area 39 thereof. The air passes through a filter element 41 and upwardly through an oil bath 42 where the oil in the air is removed so that the air may pass outwardly through a fitting 43 which is connected to the conduit 37 which delivers the air to atmosphere. This air will be free from all oil contamination and no deleterious effects will result therefrom.

The oil-mist air will provide a cooling effect to the bearings and gear teeth and reduce the possibility of damage due to heat. If oil collects on the oil slinging flange 23 it will be delivered thereby as a fine spray to the passing oil-mist air to be picked up thereby. The pressure of air in the chamber 28 being greater than that in the chamber 27 will prevent the oil-mist air from passing outwardly into the atmosphere. The air from the chamber 28 will pass through the space between the aperture 33 in the cap 32 and the driven spindle end 25. The pressure of this air on the space between the inner surface of the sealing ring 26 and the driven end 25 of the spindle, will permit some of the air to pass into the chamber 27 or at least will prevent any of the oil-mist air from passing from the chamber 27 into the chamber 28. The escape of the air from the aperture 33 has the further effect of preventing any dirt, grime or other materials from moving inwardly into the chamber 28. This protects the bearings, gears and other moving parts within the lubricated area from being damaged by such material. The air about the machine is never contaminated by the oil-mist which cools the operating parts and has the oil particles removed from the air before the air is returned to the atmosphere. The air from the chamber 28 prevents contaminants from entering the oil-mist treated area and prevents any deleterious effect occurring on the working surfaces operating therewithin.

When the oil-mist air is trapped between mutually engaged rotating parts such as gears or bearings, a certain amount of oil may be squeezed into liquid form and will collect in the bottom of the area when located in a horizontal plane. A valve 45 is threaded into an aperture 46 communicating with the area 34. When the valve is open any oil that may have accumulated in the area 34 can be drained off and the escape of oil-mist air will provide a visual indication that the lubricating system is working properly. The oil-mist lubricating system will operate indefinitely as there are no conventional seals or other parts anywhere in the lubricating system which are subject to wear in use. As pointed out above, the system is shown applied to an area containing a spindle, bearings and gears, and it is to be understood that the system may be applied to any area requiring controlled lubrication irrespective of any elements operating therewithin.

We claim:

1. In an oil-mist lubricating system, a machine having a closed area containing movable parts to be lubricated, a shaft having a driving end extending from said area, a closure element for said shaft supported by said machine and providing an outer chamber, an inlet conduit supplying oil-mist to said area, an inlet conduit to said outer chamber supplying air thereto at a pressure higher than the pressure of the oil-mist in said area, said outer chamber having an annular passageway about said shaft from which the air passes and prevents the ingress of dust and grime to said chamber and area and the passage of the oil-mist air from within said area to atmosphere through said annular passageway.

2. In an oil-mist lubricating system as recited in claim 1, wherein means are provided for limiting the flow of air from said outer chamber to said area.

3. In an oil-mist lubricating system as recited in claim 2, wherein an inner chamber is provided adjacent to said outer chamber in communication with said area, and wherein said limiting means is a sealing element located between said chambers in spaced relation to said shaft a slight amount to provide a restricted passageway therewith.

4. In an oil-mist lubricating system as recited in claim 3, wherein said annular passageway is larger in area than said restricted passageway.

5. In an oil-mist lubricating system as recited in claim 1, wherein a filter device communicates with the oil-mist area at a remote point from said oil-mist inlet conduit for separating the air from the oil-mist air and returning it to the atmosphere.

6. In an oil-mist lubricating system as recited in claim 1, wherein an oil slinger flange on said shaft is located within said oil-mist area.

7. In an oil-mist lubricating system as recited in claim 3, wherein said inlet conduit is connected to said inner chamber.

8. In an oil-mist lubricating system as recited in claim 5 wherein means is provided in communication with said area for checking the presence of oil-mist air and accumulated oil with said area.

9. In an oil-mist lubrication system for machines of the type having a closed area containing movable parts to be lubricated including at least one shaft having a driven end extending from said area, means supported by said machine defining an annular chamber around said shaft communicating outwardly with the atmosphere at one side thereof and communicating inwardly with said closed area at the other side thereof means permitting circulation of oil-mist lubricant under pressure through said area around said movable parts and adjacent to said chamber, and means providing an inlet to said chamber permitting air to be supplied thereto at a pressure higher than the pressure of oil-mist lubricant in said area adjacent to said chamber, whereby air under pressure is discharged outwardly from said chamber to atmosphere to prevent ingress of dust and grime to said chamber and to said area and is discharged simultaneously inwardly from said chamber to said area whereby to prevent escape of oil-mist lubricant to atmosphere from said area through said chamber.